Patented May 11, 1926.

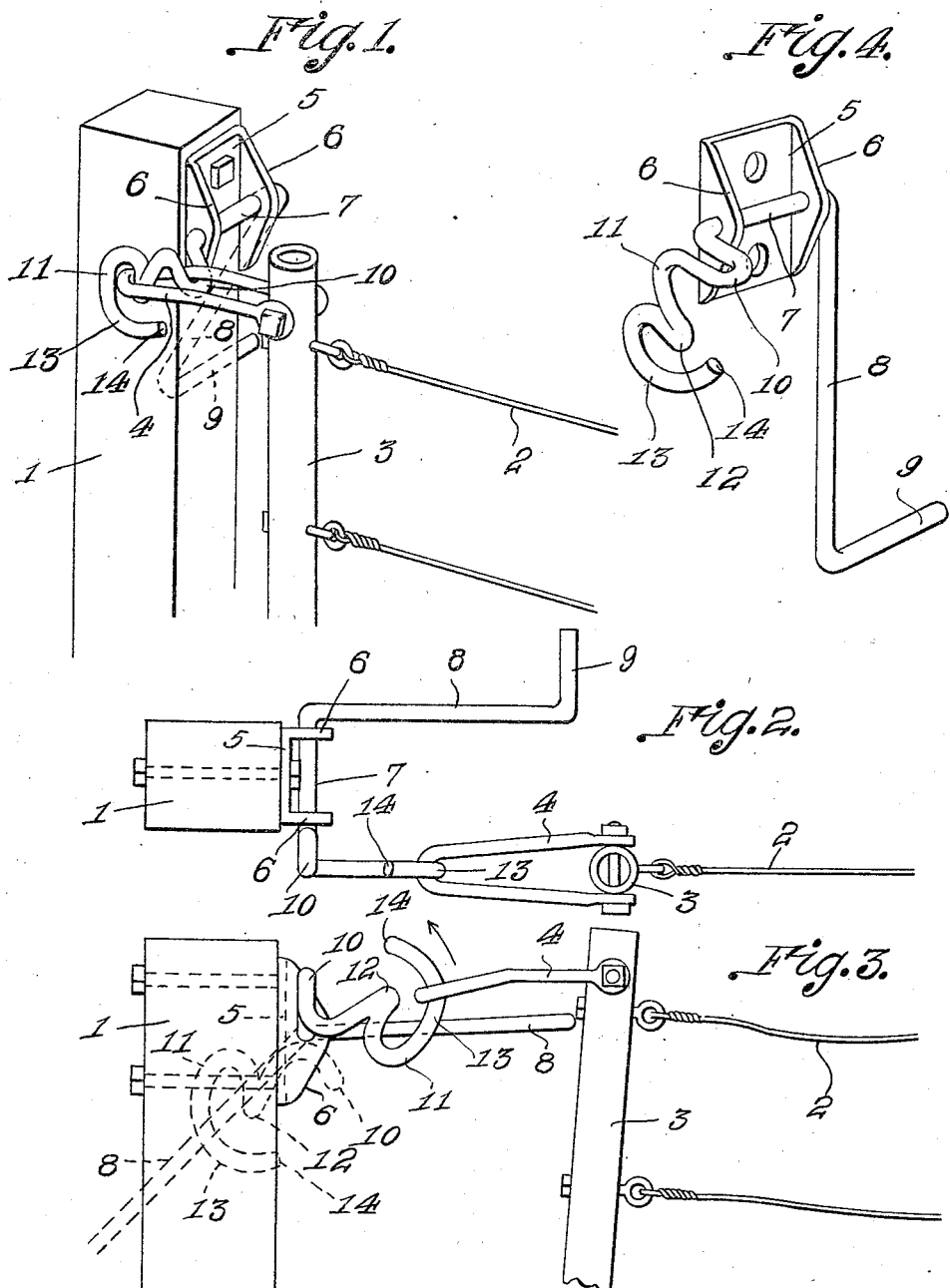

1,584,585

UNITED STATES PATENT OFFICE.

WARNER T. WOODS, OF VOLGA CITY, IOWA.

GATE FASTENER.

Application filed September 5, 1925. Serial No. 54,771.

An object of this invention is the provision of a latch or fastening device for woven or barbed wire gates, in which the fastener may be easily and quickly operated to fasten or release the gate.

To the attainment of the above broadly stated objects and others which will appear as the nature of the invention is better understood, reference is to be had to the drawings which accompany and form part of this application.

In the drawings:—

Figure 1 is a perspective view showing a gate latched to a fence post in accordance with this invention.

Figure 2 is a top plan view to illustrate the manner in which the bail at the end of the gate is initially arranged in the hook portion of the improvement.

Figure 3 is a side elevation showing the manner in which the improvement is swung to latch the gate on the latch post.

Figure 4 is a perspective view of the improvement.

Referring now to the drawings in detail, the numeral 1 designates the latch post for the gate. The gate 2 is formed of wire strands which have their ends secured to eye members on an end post 3. The end post has pivotally secured thereto a substantially U-shaped bail 4.

Secured to the outer face of the post 1, there is a plate 5. This plate is formed with outstanding ears 6, and through these ears there is journaled a shaft 7. The shaft has one of its ends extended at a right angle thereto, as indicated by the numeral 8, and this extension is formed with an offset portion 9. The offset portion, together with the element 8, provides the handle for the shaft 7. The shaft 7, on its end opposite that formed with the angle extension 8, is bent, preferably at a substantially right-angle to the said portion 8 to provide a U-shaped end 10. The outer element of the U-shaped portion is formed with an arm extension 11. This extension is centrally formed with an inwardly directed lug 12. The arm 11, from the said lug 12, is rounded upon itself to provide a hook 13, the beak portion 14 of which being directed toward, but spaced from the lug 12, and the U-shaped end 10 of the device.

Normally the handle portion of the device hangs pendent from the supporting plate or bracket 5, as disclosed in Figure 4 of the drawings. The handle is swung to the position illustrated in Figure 2 of the drawings to arrange the bail 4 in the mouth of the hook 13. The handle is further swung in the direction of the arrow in Figure 3, to bring the hook 13 to the dotted line position disclosed in the said Figure 3, and to the full line position, as shown in Figure 1 of the drawing. The bail, during this swinging of the latch, is caused to ride on the inner wall of the hook 13 and to contact with the lug 12. The inner arm of the bail is received in the U-shaped portion 10 of the latch. The wires of the gate are effectively stretched when the gate is in closed position. The bail is arranged below the pivot or shaft 7. The gate is effectively held in taut condition and the liability of the same becoming accidentally opened is entirely prevented.

Having described the invention, I claim:—

A fastening and stretching means for wire gates in which the gate has a bail pivotally secured on its end post, said means comprising a shaft journaled in bearings and having a handle at one end, a U-shaped extension at its opposite end arranged angularly with respect to the shaft, the outer element of the U-shaped extension merging into an arm provided with a centrally inturned lug and an outer hooked end, designed, when the handle is swung to engage the bail, and when the handle is further swung in the same direction to cause the bail to ride off of the look to engage the lug of the arm and to have its inner side received in the U-shaped portion of the lug of the latch.

In testimony whereof I affix my signature.

WARNER T. WOODS.